United States Patent
Cepeda-Rizo et al.

(10) Patent No.: US 9,464,638 B2
(45) Date of Patent: Oct. 11, 2016

(54) REVERSE BRAYTON CYCLE WITH BLADELESS TURBO COMPRESSOR FOR AUTOMOTIVE ENVIRONMENTAL COOLING

(71) Applicants: Juan Cepeda-Rizo, Long Beach, CA (US); Gani B. Ganapathi, La Crescenta, CA (US)

(72) Inventors: Juan Cepeda-Rizo, Long Beach, CA (US); Gani B. Ganapathi, La Crescenta, CA (US)

(73) Assignee: California Institute of Technology, Pasadena, CA (US)

(*) Notice: Subject to any disclaimer, the term of this patent is extended or adjusted under 35 U.S.C. 154(b) by 669 days.

(21) Appl. No.: 13/875,188

(22) Filed: May 1, 2013

(65) Prior Publication Data
US 2013/0294890 A1  Nov. 7, 2013

Related U.S. Application Data

(60) Provisional application No. 61/641,132, filed on May 1, 2012.

(51) Int. Cl.
F04D 29/58 (2006.01)
F25B 9/00 (2006.01)
B60H 1/32 (2006.01)

(52) U.S. Cl.
CPC .............. *F04D 29/58* (2013.01); *B60H 1/3204* (2013.01); *F25B 9/004* (2013.01)

(58) Field of Classification Search
CPC ..... F04D 29/58; B60H 1/3204; F25B 9/004; F01D 1/34

USPC .......................................................... 415/90
See application file for complete search history.

(56) References Cited

U.S. PATENT DOCUMENTS

| | | | |
|---|---|---|---|
| 1,061,142 A | 5/1913 | Testa | |
| 1,061,206 A | 5/1913 | Testa | |
| 4,036,584 A | 7/1977 | Glass | |
| 4,403,911 A * | 9/1983 | Possell | A61M 1/101 415/90 |
| 4,445,639 A * | 5/1984 | Kinsell | F02C 6/00 237/81 |
| 6,174,127 B1 * | 1/2001 | Conrad | A47L 5/22 415/1 |

(Continued)

OTHER PUBLICATIONS

Beatrice et al., "Feasibility of a Brayton Cycle Automotive Air Conditioning System," Engenharia Termica, vol. 8, No. 2, Dec. 2009.

(Continued)

*Primary Examiner* — Igor Kershteyn
*Assistant Examiner* — Aaron R Eastman
(74) *Attorney, Agent, or Firm* — Canady & Lortz LLP; Bradley K. Lortz (57) ABSTRACT

An automotive cabin cooling system uses a bladeless turbocompressor driven by automobile engine exhaust to compress incoming ambient air. The compressed air is directed to an intercooler where it is cooled and then to another bladeless turbine used as an expander where the air cools as it expands and is directed to the cabin interior. Excess energy may be captured by an alternator couple to the expander turbine. The system employs no chemical refrigerant and may be further modified to include another intercooler on the output of the expander turbine to isolate the cooled cabin environment.

21 Claims, 6 Drawing Sheets

(56) References Cited

U.S. PATENT DOCUMENTS

| | | | |
|---|---|---|---|
| 6,224,325 B1 | 5/2001 | Conrad et al. | |
| 6,261,052 B1* | 7/2001 | Conrad | F04D 17/161 |
| | | | 415/90 |
| 6,368,078 B1* | 4/2002 | Palumbo | F01D 1/36 |
| | | | 415/202 |
| 6,503,067 B2 | 1/2003 | Palumbo | |
| 6,682,007 B2 | 1/2004 | Noda et al. | |
| 6,692,232 B1* | 2/2004 | Letourneau | F01D 1/36 |
| | | | 415/90 |
| 6,726,443 B2 | 4/2004 | Collins et al. | |
| 7,125,439 B2* | 10/2006 | Bennett | B01D 53/047 |
| | | | 95/268 |
| 2005/0169743 A1* | 8/2005 | Hicks | B82Y 30/00 |
| | | | 415/90 |
| 2008/0041046 A1* | 2/2008 | Bering | F01N 5/02 |
| | | | 60/320 |
| 2009/0260361 A1* | 10/2009 | Prueitt | F01K 27/00 |
| | | | 60/670 |
| 2010/0139297 A1* | 6/2010 | McCormick | F25B 9/004 |
| | | | 62/89 |
| 2011/0239659 A1* | 10/2011 | Lior | B60H 1/004 |
| | | | 60/783 |

OTHER PUBLICATIONS

Multerer et al., "Alternative Technologies for Automobile Air Conditioning," Air Cond. and Refrig. Center, U. of Illinois Urbana, 1991.

Carey, "Assessment of Tesla Turbine Performance for Small Scale Rankine Combined . . . ," J. of Engineering for Gas Turbines and Power, ASME, Dec. 2010, vol. 132.

\* cited by examiner

REVERSE BRAYTON CYCLE WITH BLADELESS TURBO COMPRESSOR FOR AUTOMOTIVE ENVIRONMENTAL COOLING

CROSS-REFERENCE TO RELATED APPLICATIONS

This application claims the benefit under 35 U.S.C. §119(e) of the following U.S. provisional patent application, which is incorporated by reference herein:

U.S. Patent Application No. 61/641,132, filed May 1, 2012, and entitled "Reverse Brayton Cycle With Bladeless Turbo Compressor For Automotive Refrigeration", by Cepeda-Rizo et al.

STATEMENT OF GOVERNMENT RIGHTS

The invention described herein was made in the performance of work under a NASA contract, and is subject to the provisions of Public Law 96-517 (35 USC 202) in which the Contractor has elected to retain title.

BACKGROUND OF THE INVENTION

1. Field of the Invention

This invention relates to systems to provide environmental cooling in vehicle cabins, particularly in automobile cabins.

2. Description of the Related Art

Environmental heating and cooling systems for the vehicle cabins are employed for most types of vehicles in order to maintain the occupant comfort. Such systems are particularly important in vehicles which are used to transport people through extreme weather and environmental conditions such as aircraft or automobiles. Cooling systems are typically more complex than heating systems.

In automobile applications, main stream systems employ a vapor compression cycle using freon R134a, etc. as the working fluid in a closed system. In the well known system, freon is pressurized by a compressor undergoing a phase change to liquid and rise in temperature. The compressor is typically a centrifugal, vane, or scroll type pump that increases the pressure and temperature of the freon. The heated liquid freon is then passed through an intercooler (typically disposed at the front of the vehicle such that cold air can cool the liquid freon. The cooled liquid freon is then passed through an expansion device which allows the liquid freon to return to gaseous state rapidly cooling in the process. The cooled gaseous freon is then passed through another intercooler which is coupled to the cabin air forced by a fan in order to cool it, heating the gaseous freon in the process. The heated gaseous freon is then returned to the compressor to begin the cycle again.

On the other hand, aircraft cabin cooling typically employ an air cycle machine using a standard open cycle reverse Brayton process. The air cycle cooling process uses air instead of a phase changing fluid such as Freon in the gas cycle. Bladed turbines are used both for compressing the incoming air and expanding it after the heated compressed air has been cooled. Accordingly, no condensation or evaporation of a refrigerant is involved. In addition, in this case, the cooled air output from the process is used directly in the cabin or for cooling electronic equipment.

Typical automobile environmental cooling systems are efficient but expensive due to their use of refrigerant. In addition, the compressors are expensive to manufacture and the overall system is complex and susceptible to failure if a seal is breached anywhere. Typical aircraft cabin cooling systems employ expensive bladed turbines in order to compress and expand air in the system.

In view of the foregoing, there is a need in the art for improved apparatuses and methods for cooling cabin environments in automobiles. There is particularly a need for such apparatuses and methods to operate efficiently and reliably. Further, there is a need for such apparatuses and methods to be simple and affordable to manufacture and maintain and operate without refrigerant. These and other needs are met by embodiments of the present invention as detailed hereafter.

SUMMARY OF THE INVENTION

An automotive cabin cooling system uses a bladeless turbocompressor driven by automobile engine exhaust to compress incoming ambient air. The compressed air is directed to an intercooler where it is cooled and then to another bladeless turbine used as an expander where the air cools as it expands and is directed to the cabin interior. Excess energy may be captured by an alternator coupled to the expander turbine. The system employs no chemical refrigerant and may be further modified to include another intercooler on the output of the expander turbine to isolate the cooled cabin environment.

A typical embodiment of the invention comprises an apparatus for cooling an automotive cabin, comprising a bladeless turbocompressor including a first turbine receiving engine combustion gases which drive a first bladeless impeller coupled to a second bladeless impeller of a compressor, the compressor receiving air which is compressed by the second bladeless impeller, an intercooler coupled to receive and cool the compressed air from the compressor, and a second turbine receiving the cooled, compressed air from the intercooler, the second turbine having a third bladeless impeller driven by the cooled, compressed air, the cooled, compressed air expanding and becoming further cooled thereby.

In a typical embodiment, each of the first, second and third bladeless impellers comprises a plurality of planar discs spaced apart in a stack on a common shaft having fluid passages cut therethrough near the central shaft. Typically, spacing between the plurality of planar discs enables laminar fluid flow of the air to develop beginning at a boundary layer between the air and planar surfaces of the planar discs. In addition, spacing between the plurality of planar discs may be tuned such that choked flow does not occur.

In further embodiments, the first bladeless impeller may be coupled to a second bladeless impeller by a common shaft. In other embodiments, the second bladeless impeller of the compressor may be independent. In addition, air received by the compressor may be ram air directed in from outside the vehicle. Embodiments may further comprise an alternator coupled to third bladeless impellor of the second turbine for generating electrical power. In addition, a drier may be used for reducing moisture content from the air prior to being received by the compressor. In addition, embodiments of the invention may further comprise a recuperator for reducing temperature of the air prior to being received by the compressor and raising the temperature of the air after being expanded by the second turbine.

In some embodiments, the expanded cooled air from the second turbine is directed to the automotive cabin. However, in other embodiments, a heat exchanger may receive the air from the second turbine and heat it by cooling automotive cabin air passed over it, the heat exchanger then returning the air to the compressor in a closed cycle.

A typical method embodiment for cooling an automotive cabin, comprises receiving engine combustion gases in a first turbine of a bladeless turbocompressor to drive a first bladeless impeller coupled to a second bladeless impeller of a compressor, receiving and compressing air in the compressor by the second bladeless impeller, receiving and cooling the compressed air from the compressor with an intercooler, and receiving and expanding the cooled, compressed air from the intercooler in a second turbine, the second turbine having a third bladeless impeller driven by the cooled, compressed air, the cooled, compressed air expanding and becoming further cooled thereby. This method embodiment of the invention may be further modified consistent with the apparatus embodiments described herein.

Another typical embodiment of the invention may comprise an apparatus for cooling an automotive cabin, comprising a first turbine means for driving a first bladeless impeller from received engine combustion gases, the first bladeless impeller coupled to a second bladeless impeller of a compressor means for compressing air receiving by the second bladeless impeller, an intercooler means for cooling the compressed air from the compressor, and a second turbine means for expanding the received cooled, compressed air from the intercooler, the second turbine means having a third bladeless impeller driven by the cooled, compressed air, the cooled, compressed air expanding and becoming further cooled thereby. This embodiment of the invention may be further modified consistent with the apparatus or method embodiments described herein.

BRIEF DESCRIPTION OF THE DRAWINGS

Referring now to the drawings in which like reference numbers represent corresponding parts throughout.

DETAILED DESCRIPTION OF THE PREFERRED EMBODIMENT

1. Overview

Embodiments of the present invention are directed to a novel system and method for cooling automotive cabins employing three bladeless turbine/compressors. Such embodiments of the invention are an improvement over the turbocompressor air refrigeration system commonly used in aircraft which can yield cost benefits without hindering performance in automotive applications. It should be noted that the terms "bladeless" turbine and "bladeless" compressor used herein refer to Tesla turbine/compressors known in the art.

An automotive cabin cooling system embodiment of the invention uses a bladeless turbocompressor driven by automobile engine exhaust to compress incoming ambient air. The compressed air is directed to an intercooler where it is cooled and then to another bladeless turbine used as an expander where the air cools as it expands and is directed to the cabin interior. Excess energy may be captured by an alternator couple to the expander turbine. The system employs no refrigerant and may be further modified to include another intercooler on the output of the expander turbine to isolate the cooled cabin environment.

Some of the benefits of the system include using bladeless turbines and compressors (i.e. Tesla turbines) which can bring the costs down significantly over conventional impeller blade turbocompressors. The second bladeless turbine used as the expander may be optionally linked to a turbo alternator for increasing the overall system coefficient of performance (COP). In addition, no expensive refrigerant is used, so the system is not susceptible to being disabled from a minor leak. In addition, the system may be directly powered by exhaust gases from the automobile engine which would otherwise be wasted. Cooling system embodiments of the invention can deliver equal or better performance versus state of the art vapor compression units.

Figure 1:
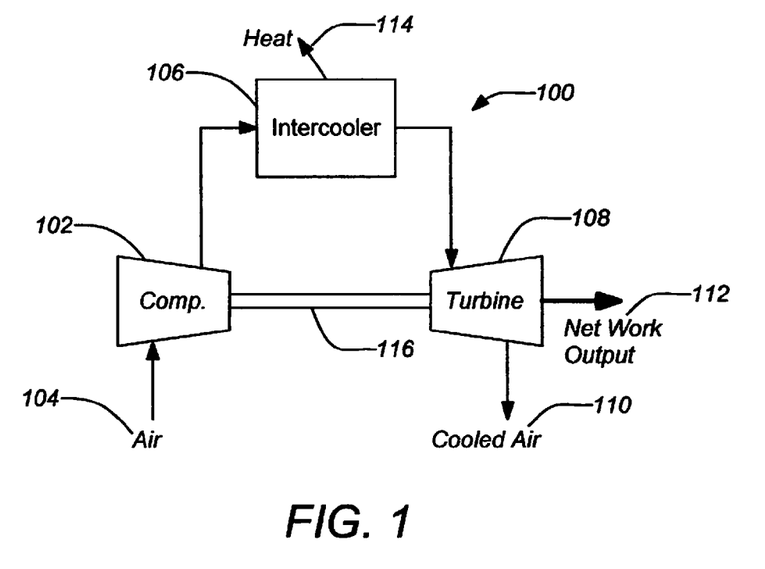
FIG. 1 is a schematic diagram of an exemplary apparatus 100 for cooling an aircraft cabin environment using a standard open cycle reverse Brayton process with a bladed compressor and turbine.

FIG. 1 is a schematic diagram of an exemplary apparatus 100 for cooling an aircraft cabin environment using a standard open cycle reverse Brayton process. The apparatus 100 employs a bladed compressor 102 which receives ambient air 104, compresses it and delivers it to an intercooler 106. Heat 114 is drawn off the air in the intercooler 106. Next the cooled pressurized air is directed to drive a bladed turbine 108 through which it cools as it expands and yielded as cooled air 110 to the cabin. Expansion of the air through the bladed turbine 108 drives coupled shaft 116 to the bladed compressor 102. In addition, excess energy from the bladed turbine 108 may be captured as a net work output 112 through a coupled generator.

Figure 2:
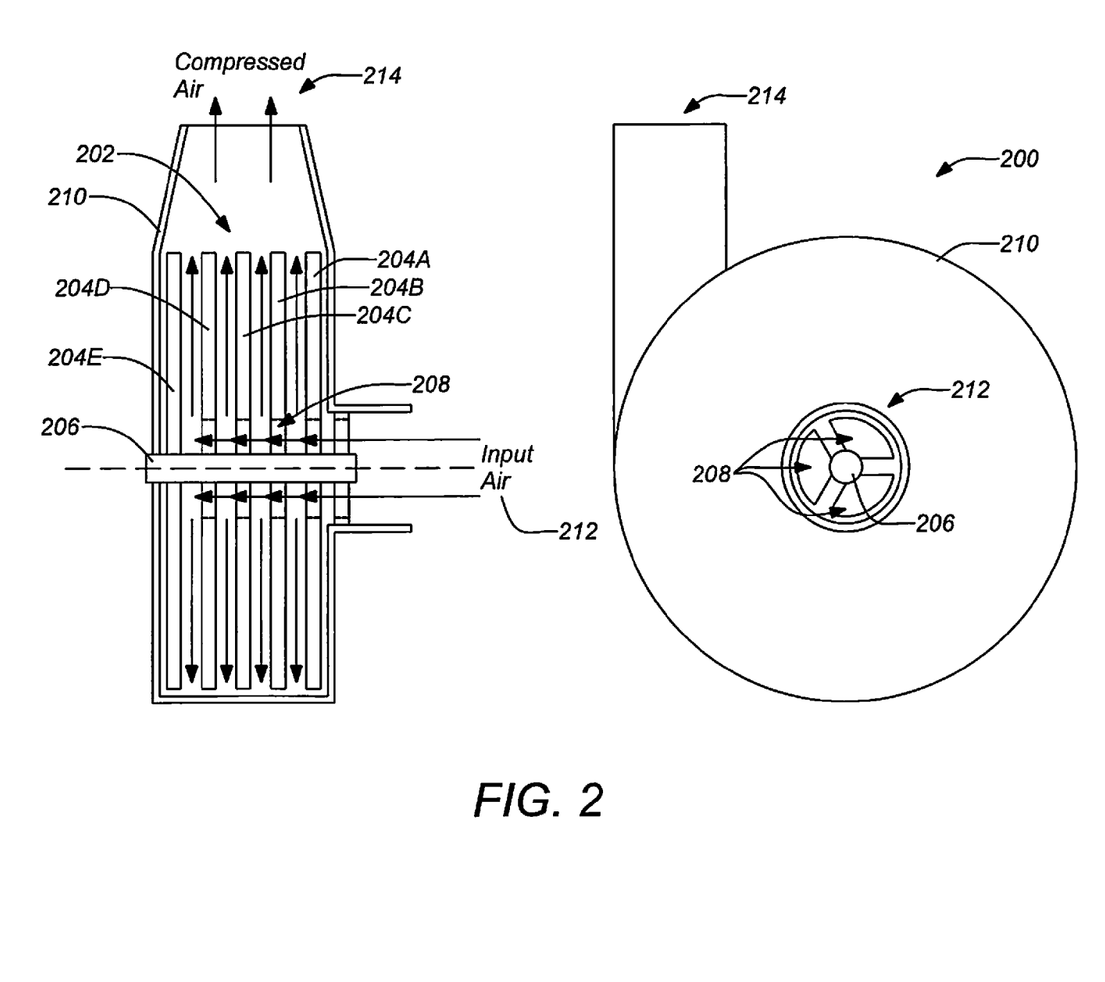
FIG. 2 is a schematic diagram of an exemplary turbine/compressor having a bladeless impeller operable in embodiments of the invention.

FIG. 2 is a schematic diagram of an exemplary turbine/compressor 200 having a bladeless impeller operable in embodiments of the invention. As mentioned above, embodiments of the invention operate using bladeless turbines/compressors (Tesla turbines). An example compressor 200 employs a bladeless impeller 202 comprising a plurality of planar discs 204A-204E spaced apart in a stack on a common shaft 206 having fluid passages 208 cut through the planar discs 204A-204E near the central shaft 206. Laminar fluid flow is developed beginning at a boundary layer between the fluid and the planar surfaces of the discs 204A-204E. The bladeless impeller 202 is disposed in a housing 210 having an inlet 212 along an axis of the central shaft 206 and an outlet 214 at the outer edge of the housing 210.

To operate as a compressor 200 in the example, the bladeless impeller 202 is driven to rotate clockwise as shown by the shaft and draws in the input air and compresses as it is forced through the outlet 214. Alternately, to operate as a turbine, the inlet 212 and outlet 214 are reversed; compressed air is received at the outlet 214 and drives the bladeless impeller 202 to rotate clockwise as it expands to exit at the inlet 214. Those skilled in the art will appreciate that the specific design of the turbine/compressor will vary and can be optimized for the particular application. The number and size of planar discs, spacing between discs, size of fluid passages, flow direction (clockwise/counterclockwise) and materials will vary accordingly.

2. Example Open Cycle Air Cooling System Embodiments

Figure 3A:
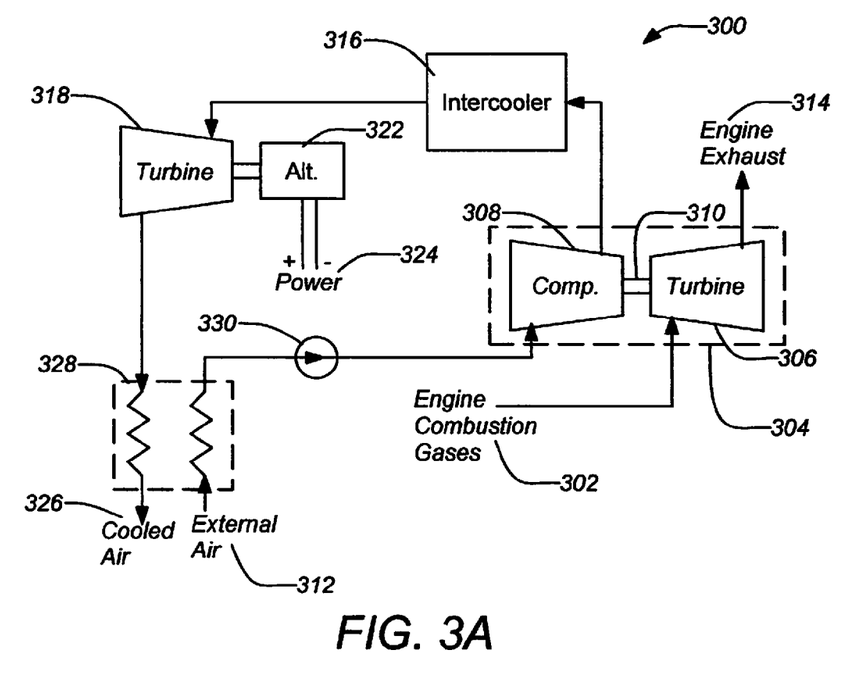
FIG. 3A is a schematic diagram of an exemplary apparatus for cooling an automotive cabin environment using three bladeless turbines in an open cycle system.

FIG. 3A is a schematic diagram of an exemplary apparatus 300 of the invention for cooling an automotive cabin environment using three bladeless impellers, i.e. two in a bladeless turbocompressor (including a bladeless compressor coupled directly to a bladeless turbine) and another in a second bladeless turbine. In the exemplary apparatus 300, hot engine combustion gases 302 from the automobile engine are directed to a bladeless turbocompressor 304. The engine may be a standard combustion engine, two-stroke, four-stroke, rotary, or any other suitable type that produces enough exhaust gas to drive a bladeless turbocompressor.

The turbocompressor 304 comprises a first turbine 306 and a compressor 308 that are coupled together by a common shaft 310. The hot engine combustion gases 302 enter an inlet of the first turbine 306 to drive the common shaft 310 coupled to the compressor 308 and then exit an outlet to the engine exhaust 314. The air cycle starts as ambient air 312 enters the compressor 308 (which, in some embodiments may first pass through a recuperator 328 and drier 330 discussed in section 5 hereafter). The air 312 is compressed (which causes it to heat up) and is delivered to an isobaric intercooler 316 which precools the compressed air to near ambient temperature. The above ambient temperature air then undergoes isentropic expansion by means of a second bladeless turbine 318 which causes it to further cool. The cooled expanded air 326 is then sent to the vehicle interior (which, in some embodiments may first pass through a recuperator 328 discussed in section 5 hereafter). Optionally, the second bladeless turbine 318 may also be coupled to an alternator 322 (turbo alternator) and produces electric power 324 from the excess energy liberated from the expansion as rotational energy of the bladeless turbine 318 shaft. This electric power 324 may be used to charge the vehicle's electrical system battery or a hybrid battery for auxiliary power.

As discussed above, embodiments of the invention are direct to environmental cooling utilizing a reverse Brayton cycle cooling process in a novel apparatus. Brayton cycle cooling is used currently in commercial aircraft. In addition, NASA has previously employed a reverse Brayton cryocooler from Creare to cool the NiCMOS instrument onboard the Hubble Space Telescope. Brayton cycle coolers are also commonly used in the condensation and production of liquid nitrogen from atmospheric air.

An example reverse Brayton cycle cooler embodiment of the invention uses air as the working fluid to replace mainstream freon R134a vapor compression systems in an automotive vehicle. In various embodiments of the invention, the cooled air operating as the working fluid remains in a gaseous state; it does not change phase in contrast with the freon R134a used in conventional cooling systems. One example system requires 1.3-1.7 kW from the engine, harnessed from the exhaust waste heat, and is capable of lifting 4.5-5.6 kW of heat (1.25-1.56 tons refrigeration). This is sufficient for providing air conditioning for a standard midsize vehicle under hot static conditions similar to a test parameters report submitted by Chrysler. A published study demonstrated that a system can be created with an off the shelf turbocharger that would be approximately 56% more expensive and 10% heavier, but a bladeless turbocompressor is proposed to bring down both cost and weight as well as increase overall system efficiency and less fuel consumption. Reverse Brayton embodiments of the invention can operate as either open or closed systems with different benefits for each. There is enough exhaust heat to run the system while in idle mode, although the system can easily be alternately configured to be pulley-driven at the cost of reduced efficiency. In this case, the turbine of the turbocompressor would be replaced with a pulley driven by the automotive engine in the apparatus 300 of FIG. 3A.

3. Example Closed Cycle Air Cooling System Embodiments

Figure 3B:
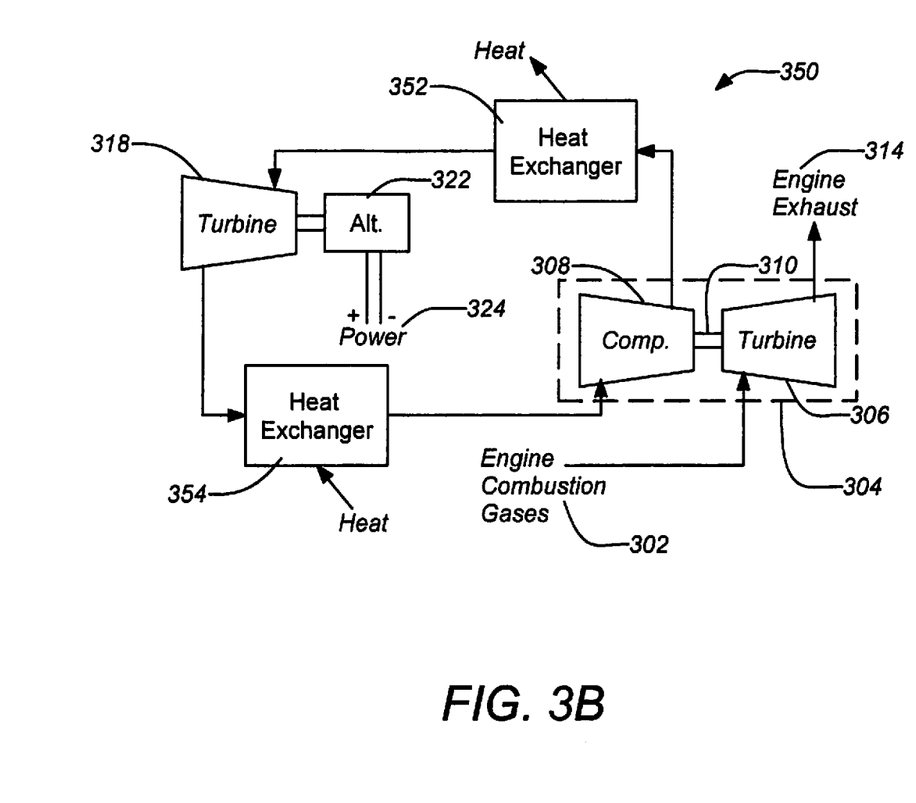
FIG. 3B is a schematic diagram of an exemplary apparatus for cooling an automotive cabin environment using three bladeless turbines in a closed cycle system.

In a further embodiment of the invention to yield a gain in efficiency is to create a closed cycle system apparatus 350 that recirculates dry air as shown in FIG. 3B. Operation of the apparatus 350 of FIG. 3B is essentially the same as the apparatus 300 of FIG. 3A detailed in the prior section except as described hereafter. Air is employed as the working fluid of the closed cycle system, but it does not change state through the process.

Referring to FIG. 3B, Exhaust gases from the automobile engine are still used to power the compressor 308 just as with the open cycle apparatus of FIG. 3A, but in this case the intercooler 316 is replaced by two heat exchangers 352, 354. (This system 350 would operate in a manner analogous to standard vapor compression systems that have one heat exchanger at the condenser and one at the evaporator.) The first heat exchanger 352 (which can also be considered intercooler 316) cools the compressed heated air from the compressor 308. The second heat exchanger 354 heats the cooled expanded air from the second turbine 318 and thereby cools the external air passing over it which is directed to the automobile cabin.

Figure 3C:
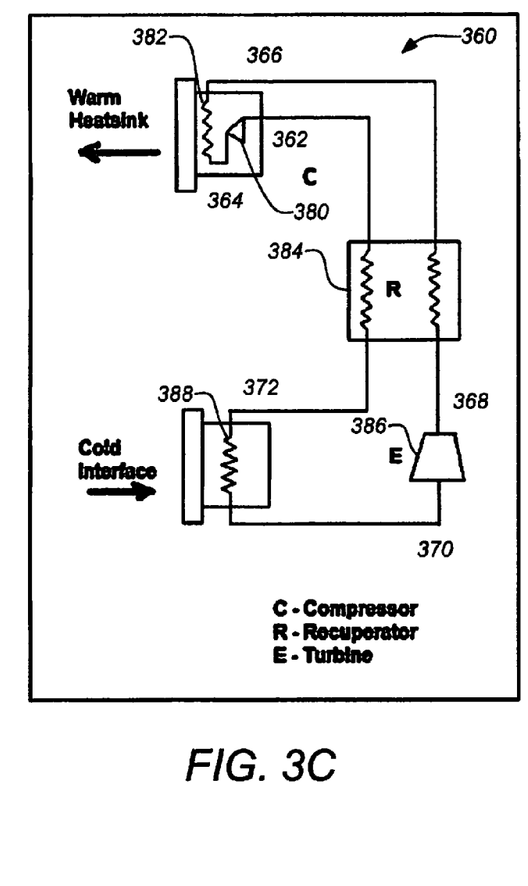
FIG. 3C is schematic diagram of another exemplary apparatus for cooling an automotive cabin environment in a closed cycle system.
Figure 3D:
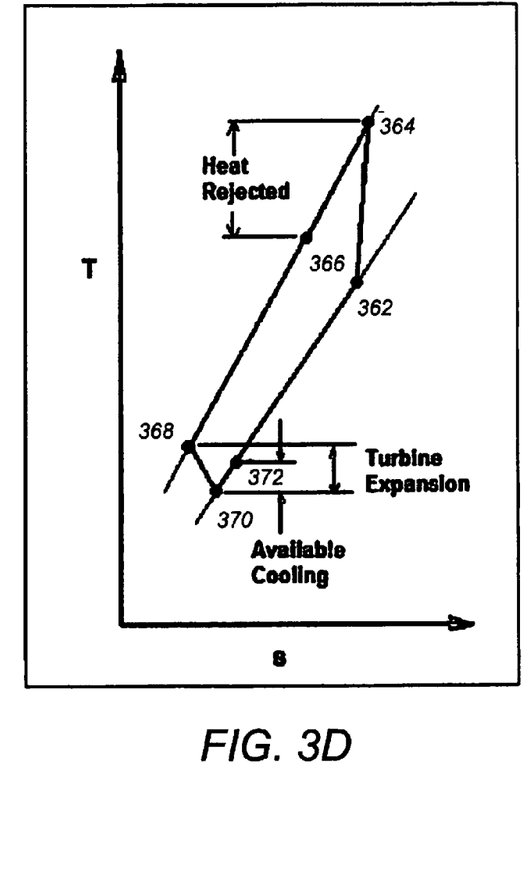
FIG. 3D illustrates the closed cycle reverse Brayton process performed by the apparatus of FIG. 3C.

Another more efficient approach would be to use a third regenerative heat exchanger in the apparatus 360 as shown in FIG. 3C. FIG. 3D. illustrates the closed cycle reverse Brayton process performed by the apparatus 360 of FIG. 3C with the various states of the air indicated by the corresponding state labels 362-372. Dry air enters the compressor 380 at 362 and through isentropic compression heats to state 364, which is run through a heat exchanger 382 (similar to a condenser heat exchanger in a conventional vapor compression system). The hot gas cools to state 366 and is sent to the regenerator 384 which cools the gas even further to state 368. The gas then undergoes isentropic expansion through the turbine expander 386 and is cooled to its coldest state, state 370. The cold gas enters the cold heat exchanger 388 and enters state 372 (which cools the automobile cabin air). The still cold gas then enters the regenerator which absorbs heat and enters state 362 where the cycle repeats.

The benefit of the regenerative closed system is lesser compressor power to achieve the cooling temperatures and thus improved overall efficiency. Also in all closed systems, because the quality of the air refrigerant is controlled, the lifespan of the system typically increases. The tradeoff with an open system is the need for heat exchangers at the hot and cold side of the cycle. There is an additional associated cost for a regenerator which must be justified versus the gain in performance.

4. Example Method of Cooling Air

Figure 4:
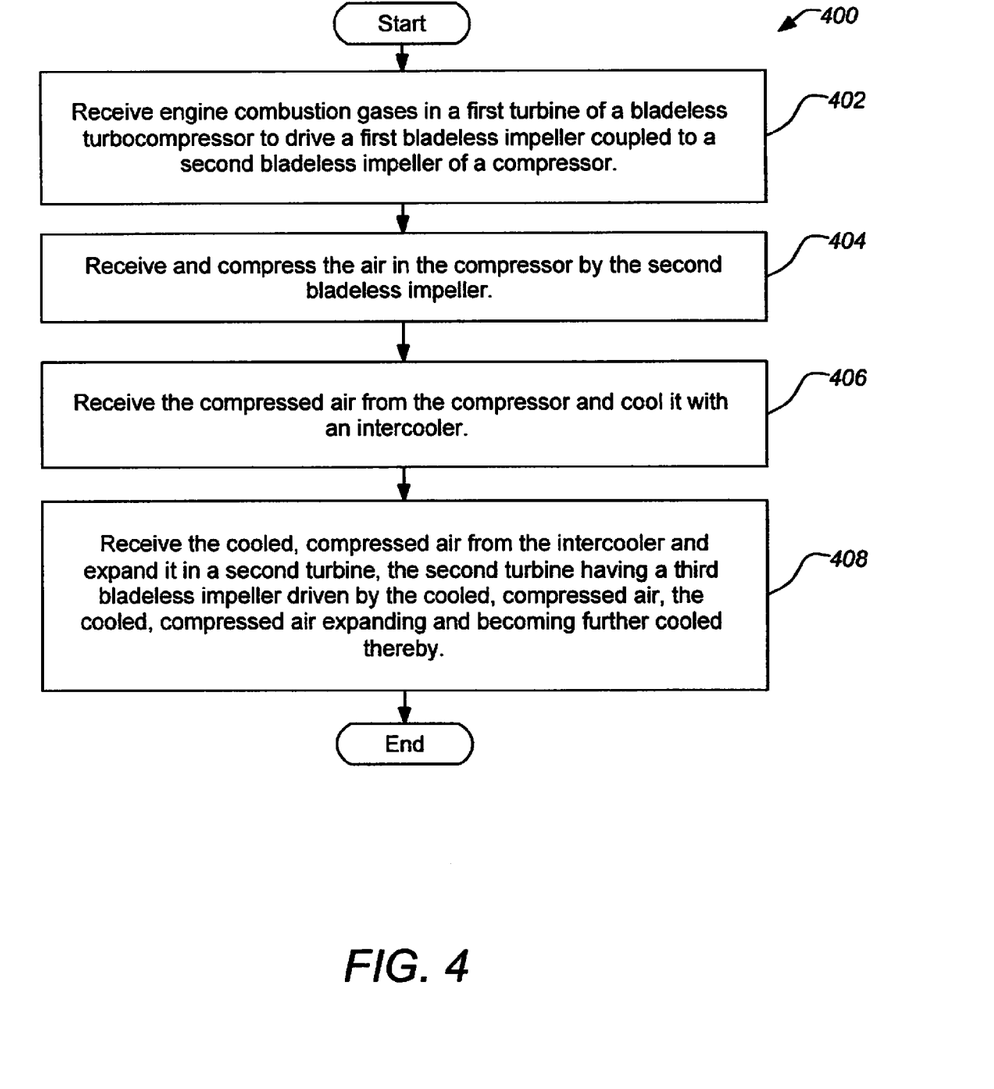
FIG. 4 is a flowchart of an exemplary method of cooling an automotive cabin according to an embodiment of the invention.

FIG. 4 is a flowchart of an exemplary method 400 of cooling an automotive cabin. The method 400 comprises a first operation 402 of receiving engine combustion gases in a first turbine of a bladeless turbocompressor to drive a first bladeless impeller coupled to a second bladeless impeller of a compressor. In operation 404, air is received and compressed in the compressor by the second bladeless impeller. Next in operation 406, the compressed air is received from the compressor and cooled with an intercooler. Following this in operation 408, the cooled, compressed air is received from the intercooler and expanded in a second turbine, the second turbine having a third bladeless impeller driven by the cooled, compressed air, the cooled, compressed air expanding and becoming further cooled thereby.

This method 400 may be altered consistent with the various apparatus embodiments previously described to incorporate optional operations. For example, the method 400 may further include receiving and heating the air from the second turbine by cooling automotive cabin air passed over it in a heat exchanger and then returning the air to the compressor in a closed cycle and/or generating electrical power from an alternator coupled to third bladeless impellor of the second turbine. The method 400 may also include reducing moisture content from the air in a drier prior to being received by the compressor and/or reducing temperature of the air in a recuperator prior to being received by the compressor and raising the temperature of the air after being expanded by the second turbine. It is also important to note that the steps may be performed in any suitable order.

5. Baseline Automotive Cabin Air Cooling Sizing & Performance

A baseline example system employing an embodiment of the invention may be sized based on a typical automobile at the time of the study (e.g. a 1990 Pontiac Grand Prix), an ambient temperature of 52° C. (125° F.), an in-car temperature of 24° C. (75° F.), a vehicle speed of 55 mph and a maximum hot soak pull-down time of approximately 120 seconds. See Multerer et al., "Alternative Technologies for Automobile Air Conditioning," Air Conditioning and Refrigeration Center, U. of Illinois, Urbana, 1991, which is incorporated by reference herein. Ambient Conditions and Constants are provided in Table 1 below.

TABLE 1

Baseline Air-conditioning and Vehicle Parameters

| Parameter | Value |
|---|---|
| Ambient Temperature | 52° C. |
| In car temperature | 24° C. |
| Solar irradiation | 900 W/m$^2$ |
| Driving speed | 55 mph |
| Air density at 52° C. | 1.1 kg/m$^3$ |
| Air density at 24° C. | 1.3 kg/m$^3$ |
| Thermal conductivity of plate glass | 1.4 W/mK |
| Windshield thickness | 0.25 in |
| Area of windshield | 1.4 m$^2$ |
| Total window area | 3.41 m$^2$ |
| Max. A/C pull-down time | 120 sec |

In the example case, the vehicle heat load is dominated by two large heat sources: solar irradiation and body conductance. It is a surprising result that when the car is moving, the largest single heat load on the system is not solar, but rather heat conduction/convection through the vehicle windows. In other words, in hot weather driving the faster the vehicle travels the more heat convection intrusion dominates over solar radiation.

Solar radiation is the first major source of heat input to a passenger vehicle and at the surface of the earth is assumed to be 900 W/m$^2$. The total window area of the 1990 Pontiac Grand Prix is approximately 3.41 m$^2$, but realizing that half of the area is exposed to the sun at any given time, the maximum is reduced to 1.7 m$^2$. When a solar view of 30 degree is taken into account, this area reduces to 1.5 m$^2$. Glass transmittance is approximately 1.00. With this information the solar load is calculated as approximately 1.35 kW.

Though solar radiation heats the vehicle and passenger compartment during the day whether or not the vehicle is running, most air conditioning uses occur when the vehicle is in motion. Next, consider heat that is brought into the vehicle by air convection, then by conduction through the body panels and windows of the vehicle. For the vehicle velocities considered, the body conductance roughly varies linearly with velocity. When traveling at 55 mph, this body conductance has a typical value of 80 W/K. When the temperature difference between the outside and inside of the car is 28° C. (52-24° C.), the body conductance is approximately 2.24 kW. This is a rough estimate that shows that heat intrusion by conduction into the vehicle roughly varies linearly with the speed of the vehicle and temperature difference with the outside environment. Thus, in this example the body load is approximately 60% larger than the solar load.

To sum up the steady-state heat loads affecting the passenger space we must also account for outside air and passenger heat loads. The most important of these external loads is the amount of outside air, at ambient temperature, being brought into the passenger compartment. This is a variable load that can be adjusted by the driver of the vehicle. One extreme case involves full inside air recirculation with no replacement, while the other extreme replaces the air about twice a minute. A conservative amount of replacement air, 0.25 m$^3$/min, is assumed for baseline case. The calculation for the replacement air cooling requirement at 0.25 m$^3$/min and delta T of 28° C. gives 0.12 kW. The thermal impact of the replacement air is higher for higher flow rates.

In addition, the driver and passenger give off heat, assumed 120 W of heat for a total of 0.24 kW. Finally, a small amount of heat leaks in from the engine and transaxle, assumed to total approximately 0.50 kW of heat input involves full inside air recirculation with no replacement, while the other extreme replaces the air about twice a minute. A conservative amount of replacement air, 0.25 m$^3$/min, is assumed for the baseline case. The calculation for the replacement air cooling requirement at 0.25 m$^3$/min and delta T of 28° C. gives 0.12 kW. The thermal impact of the replacement air is higher for higher flow rates. The steady-state heat load summary for the baseline case example is given in Table 2 below.

TABLE 2

Total Baseline Heat Load

| Parameter | Load | Fraction |
|---|---|---|
| Solar radiative load at 900 W/m$^2$ | 1.35 kW | 0.30 |
| Body conductance load at 55 mph | 2.24 kW | 0.50 |
| Recirculated air energy | 0.12 kW | 0.03 |
| Driver and one passenger | 0.24 kW | 0.06 |
| Engine loads | 0.50 kW | 0.11 |
| Total | 4.50 kW | 1.00 |

A commonly used basis for comparing efficiency of two A/C systems is the Coefficient of Performance (COP), which is defined and the energy rate of cooling/input energy. However, the COP index gives unfair advantage to systems that use electric power for the input energy and is not suitably compared with systems that derive input from waste heat. If waste heat is not used to power the compressor and instead a belt drive is used to run the compressor, the different identified technologies would compare as shown in FIG. 5A.

Figure 5A:
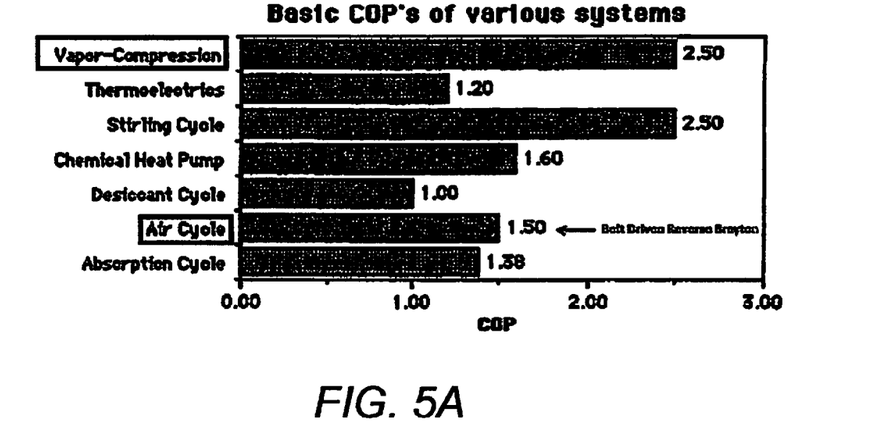
FIG. 5A shows the basic coefficients of performance (COP) of different cooling technologies.

As shown in FIG. 5A, R134a vapor compression has a higher COP efficiency than does the "Air Cycle," which is also known as the belt driven reverse Brayton cycle A/C. For system embodiments of the present invention that derive input power from automotive exhaust gas, the COP values should be normalized to meet the following definition: the overall COP is the heat removed from the vehicle divided by the heating value of the required fuel.

Figure 5B:
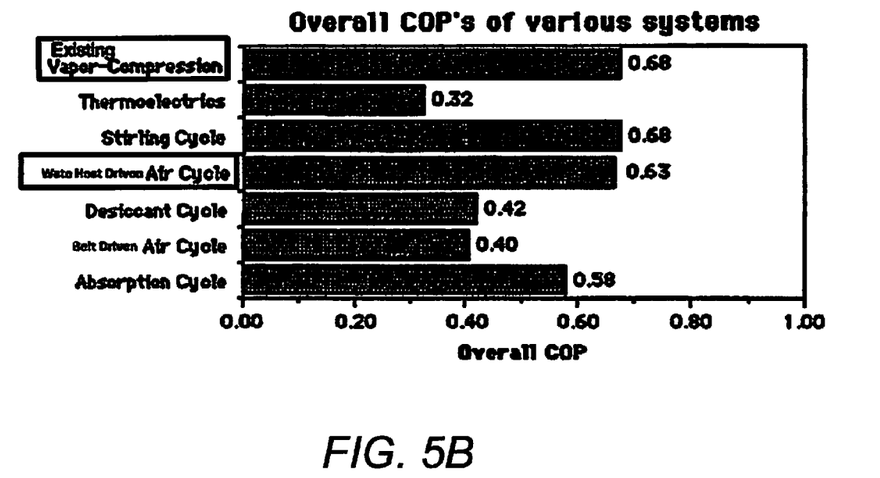
FIG. 5B shows the normalized overall coefficients of performance (COP) of different cooling technologies.

As shown in FIG. 5B, the normalization of COP is accomplished by assuming the base energy efficiency of the automobile engine is 30%, leaving 70% of the fuel energy as radiator or exhaust waste. For a waste heat-driven A/C system, the heat exchanger is assumed to recover 60%, resulting in an overall 42% efficiency. For the belt driven or electrically-driven systems the drive system is assumed to be 90% efficient, which combined with the base engine efficiency, results in an overall 27% efficiency. These normalized factors are multiplied by the basic COP to give an overall COP.

An ideal reverse Brayton cycle analysis can be performed to show such a system is capable of removing the necessary 4.5 kW vehicle heat load by using the waste heat of the exhaust. Assuming a pressure ratio of 2.25 at the compressor from the four states shown previously in Figure XA, the analysis results in the following temperatures,

| | |
|---|---|
| $T_1 = 10°$ C. | $h_1 = 283.15$ kJ/kg |
| $T_2 = 83.5°$ C. | $h_1 = 356.6$ kJ/kg |
| $T_3 = 38°$ C. | $h_3 = 311.25$ kJ/kg |
| $T_4 = -26.5°$ C. | $h_4 = 246.64$ kJ/kg |

Mass flow at the compressor, $\dot{m} = 0.1285$ kg/s (16.4 lbm/min) and Heat lift, $q_L = (h_1 - h_4) \times \dot{m} = 36.51 \times 0.1258 = 4.69$ kW.

As previously described, the simplicity of a bladeless turbine (i.e. Tesla-type turbine) can allow a low cost, reliable design for a turbocompressor and turbine expander that can be an attractive option for reverse Brayton air conditioning systems if an efficient design can be achieved. Though standard off the shelf turbocompressors (bladed turbochargers or superchargers) can be designed into a reverse Brayton system, it is believed that the cost of the turbocompressors would make it unattractive compared to a standard vapor compression system. See V. Carey, "Assessment of Tesla Turbine Performance for Small Scale Rankine Combined Heat and Power Systems," J. of Engineering for Gas Turbines and Power, ASME, December 2010, Vol. 132, which is incorporated by reference herein.

A study performed by Beatrice and Fiorelli demonstrated that the use of off an existing commercial off the shelf (COTS) turbocompressor from Honeywell/Garrett would result in a system that is approximately 40% more expensive than a standard vapor compression system. Main components for a conventional freon R134a vapor compression system are estimated as compressor ($800), evaporator/expansion device ($500), and condenser ($400), totaling $1,700. In contrast, a reverse Brayton cycle system employing a COTS turbocompressor includes main components estimated as turbocompressor ($2,000), intercooler ($300), evaporative system/dryer ($200), and expansion device ($150), totaling $2,650. See Beatrice et al., "Feasibility of a Brayton Cycle Automotive Air Conditioning System," Engenharia Termica, Vol. 8, No. 2, December 2009, which is incorporated by reference herein.

Embodiments of the present invention which employ reverse Brayton A/C system driven by waste heat can deliver an overall COP of 0.63 comparable to existing R134a vapor compression of 0.68. It is further estimated that use of the bladeless turbine technology at the compressor and expander will increase the COP and even surpass that of vapor compression. In addition, it is estimated that the significantly lower cost of bladeless turbines over COTS turbocompressors will enable system cost to be at least comparable to standard vapor compression systems.

It is estimated that on average a midsize vehicle will consume about one gallon of gasoline for every one hour that it idles. Under these conditions and assuming a gallon of gasoline contains 39 kW of energy rate content. Considering experimental data provided by manufacturers, the turbocompressor increases the outlet engine pressure by 3.5% in the worst case scenario, and the impact on the engine power is nearly the same. So if the engine power at idle is 39 kW, the turbocompressor impact is 1.35 kW, which is enough power to provide a decent amount of air conditioning and in the neighborhood of the input power required for a conventional air conditioning system.

By using off the shelf components, Beatrice and Fiorelli had their system evaluated at 11.5 kg, while a conventional vapor compression system weighed 10.5 kg. The turbocompressor accounts for over 50% of the total weight, similar to a conventional vapor compression system, and most of the weight is due to a very thick and heavy housing needed to meet safety standards from high speed rotation. A bladeless Tesla turbine would not require as thick of housing because of the lower rotation inertia compared to centrifugal blades. It is estimated that the total weight of a system with a bladeless Tesla turbine should drop below 10 kg.

As seen from the performance estimates of the system, the air will cool well below dew point and the moisture will have to be removed before being sent to the vehicle cabin. Off the shelf air driers/descicants exist that can be put into the system; they are conch shaped and remove dew from the air by rotating it and having it condense on the walls.

In the event that the air is not cooled substantially cooled below dew point, a recuperator can be placed between air intake of the compressor and air exit into the vehicle cabin as shown in the apparatus 300 referring back to FIG. 3A. Recuperators and driers are known in the art and any suitably size device may be employed as will be understood by those skilled in the art. The recuperator can be a plate-type air-to-air heat exchanger, that are both low cost and high efficiency. The recuperator 328 lowers the temperature of the ambient air as before it enters the compressor 308, which allows for higher compressibility as colder air compresses more efficiently. It also lowers to overall temperature of the incoming air. Condensate can be collected and removed (reducing moisture content) from the ambient air by a drier 330 before entering the compressor 308 disposed between the recuperator 328 and the compressor 308. As the air leaves the turbine 318 and enters the recuperator 328, it then heats the air a little (which still remains cool) but making it more comfortable for the passengers. Another, relatively simple approach for drying could be implemented using membranes to dehumidify the air before it enters the Brayton turbocompressor. The drier used in aircraft is a spin/centrifugal type that separates moisture from the air by rotation and can be employed in the automotive application.

The drier can also be a plate-type adsorption drier that allows condensation to happen on the plate surface.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. An apparatus for cooling an automotive cabin, comprising:
    a bladeless turbocompressor including a first turbine receiving engine combustion gases which drive a first bladeless impeller coupled to a second bladeless impeller of a compressor, the compressor receiving air which is then compressed by the second bladeless impeller;
    an intercooler coupled to receive and cool the compressed air from the compressor; and
    a second turbine receiving the cooled, compressed air from the intercooler, the second turbine having a third bladeless impeller uncoupled from the first bladeless impeller and the second bladeless impeller and driven by the cooled, compressed air, the cooled, compressed air expanding and becoming further cooled thereby.

2. The apparatus of claim 1, wherein each of the first, second and third bladeless impellers comprises a plurality of planar discs spaced apart in a stack on a common shaft having fluid passages cut therethrough near the central shaft.

3. The apparatus of claim 2, wherein spacing between the plurality of planar discs enables laminar fluid flow of the air to develop beginning at a boundary layer between the air and planar surfaces of the planar discs.

4. The apparatus of claim 2, wherein spacing between the plurality of planar discs is such that choked flow does not occur.

5. The apparatus of claim 1, wherein the first bladeless impeller is coupled to a second bladeless impeller by a common shaft.

6. The apparatus of claim 1, wherein the air received by the compressor is ram air directed in from outside the vehicle.

7. The apparatus of claim 1, further comprising a heat exchanger receiving the air from the second turbine and heating it by cooling automotive cabin air passed over it, the heat exchanger then returning the air to the compressor in a closed cycle.

8. The apparatus of claim 1, further comprising an alternator coupled to third bladeless impellor of the second turbine for generating electrical power.

9. The apparatus of claim 1, further comprising a drier for reducing moisture content from the air prior to being received by the compressor.

10. The apparatus of claim 9, further comprising a recuperator for reducing temperature of the air prior to being received by the compressor and raising the temperature of the air after being expanded by the second turbine.

11. A method for cooling an automotive cabin, comprising:
    receiving engine combustion gases in a first turbine of a bladeless turbocompressor to drive a first bladeless impeller coupled to a second bladeless impeller of a compressor;
    receiving and compressing air in the compressor by the second bladeless impeller;
    receiving and cooling the compressed air from the compressor with an intercooler; and
    receiving and expanding the cooled, compressed air from the intercooler in a second turbine, the second turbine having a third bladeless impeller uncoupled from the first bladeless impeller and the second bladeless impeller and driven by the cooled, compressed air, the cooled, compressed air expanding and becoming further cooled thereby.

12. The method of claim 11, wherein each of the first, second and third bladeless impellers comprises a plurality of planar discs spaced apart in a stack on a common shaft having fluid passages cut therethrough near the central shaft.

13. The method of claim 12, wherein spacing between the plurality of planar discs enables laminar fluid flow of the air to develop beginning at a boundary layer between the air and planar surfaces of the planar discs.

14. The method of claim 12, wherein spacing between the plurality of planar discs is such that choked flow does not occur.

15. The method of claim 11, wherein the first bladeless impeller is coupled to a second bladeless impeller by a common shaft.

16. The method of claim 11, wherein the air received by the compressor is ram air directed in from outside the vehicle.

17. The method of claim 11, further comprising receiving and heating the air from the second turbine by cooling automotive cabin air passed over it in a heat exchanger and then returning the air to the compressor in a closed cycle.

18. The method of claim 11, further comprising generating electrical power from an alternator coupled to third bladeless impellor of the second turbine.

19. The method of claim 11, further comprising reducing moisture content from the air in a drier prior to being received by the compressor.

20. The method of claim 19, further comprising reducing temperature of the air in a recuperator prior to being received by the compressor and raising the temperature of the air after being expanded by the second turbine.

21. An apparatus for cooling an automotive cabin, comprising:
    a first bladeless means for driving a second bladeless means from received engine combustion gases, the second bladeless means for compressing received air driven by the first bladeless means;
    a cooling means for cooling the compressed air from the compressor; and
    a third bladeless means for expanding the received cooled, compressed air from the cooling means, the third bladeless means uncoupled from the first bladeless means and the second bladeless means and driven by the cooled, compressed air, the cooled, compressed air expanding and becoming further cooled thereby.

* * * * *